US009565680B2

(12) United States Patent
Wang et al.

(10) Patent No.: US 9,565,680 B2
(45) Date of Patent: Feb. 7, 2017

(54) METHOD AND APPARATUS FOR CONFIGURING CHANNEL RESOURCE, BASE STATION, AND USER EQUIPMENT

(71) Applicant: HUAWEI TECHNOLOGIES CO., LTD., Shenzhen (CN)

(72) Inventors: Xiaoxia Wang, Shanghai (CN); Jian Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 244 days.

(21) Appl. No.: 14/143,960

(22) Filed: Dec. 30, 2013

(65) Prior Publication Data
US 2014/0185440 A1    Jul. 3, 2014

Related U.S. Application Data

(63) Continuation of application No. PCT/CN2012/088138, filed on Dec. 31, 2012.

(51) Int. Cl.
*H04W 72/04*    (2009.01)
*H04W 28/02*    (2009.01)
(Continued)

(52) U.S. Cl.
CPC ..... *H04W 72/0486* (2013.01); *H04W 28/0289* (2013.01); *H04W 52/146* (2013.01);
(Continued)

(58) Field of Classification Search
CPC ............. H04W 72/0486; H04W 28/0289; H04W 52/02; H04W 52/0209; H04W 52/18; H04W 52/30; H04W 52/38; H04W 52/146; H04W 52/325; H04W 52/343; H04W 52/362
See application file for complete search history.

(56) References Cited

U.S. PATENT DOCUMENTS 6,128,500 A    10/2000   Raghavan et al.
2003/0112773 A1  6/2003   Lee et al.
(Continued)

FOREIGN PATENT DOCUMENTS

CN    1420704 A    5/2003
CN    1559112 A    12/2004
(Continued)

*Primary Examiner* — Gary Mui
*Assistant Examiner* — Stephen Steiner
(74) *Attorney, Agent, or Firm* — Brinks Gilson & Lione

(57) ABSTRACT

A method and an apparatus for configuring a channel resource, a base station, and a user equipment are disclosed. The method includes: determining load information of a cell; according to the load information, that the cell reaches a congested state, configuring channel resource configuration information for a new user equipment accessing the cell, where the configuration information includes: a first DPCH Pilot bit transmit power offset and/or a first number of pilot bits, the first DPCH Pilot bit transmit power offset is smaller than a power offset configured for a user equipment in a non-congested state, and the first number of Pilot bits is smaller than a number of Pilot bits that is configured for a user equipment in a non-congested state, and sending the configuration information to the new user equipment. The method can improve downlink throughput of the cell and reducing a call drop rate.

14 Claims, 3 Drawing Sheets

Receive channel resource configuration information that is configured for a new user equipment accessing a cell and is sent by a network side device, where the channel resource configuration information includes: a first dedicated physical channel pilot DPCH Pilot bit transmit power offset and/or the first number of pilot bits, the first DPCH Pilot bit transmit power offset is smaller than a DPCH Pilot bit transmit power offset configured for a user equipment in a non-congested state, and the first number of Pilot bits is smaller than the number of Pilot bits that is configured for a user equipment in a non-congested state ⟶ 201

Adjust a channel resource according to the channel resource configuration information ⟶ 202

(51) Int. Cl.
   *H04W 52/14*    (2009.01)
   *H04W 52/32*    (2009.01)
   *H04W 52/34*    (2009.01)
   *H04W 52/36*    (2009.01)

(52) U.S. Cl.
   CPC ....... *H04W 52/325* (2013.01); *H04W 52/343* (2013.01); *H04W 52/362* (2013.01); *Y02B 60/50* (2013.01)

(56) References Cited

U.S. PATENT DOCUMENTS

| | | | |
|---|---|---|---|
| 2004/0160921 A1* | 8/2004 | Kaipainen | H04B 7/0619 370/335 |
| 2004/0242257 A1 | 12/2004 | Valkealahti et al. | |
| 2006/0234714 A1* | 10/2006 | Pollini | H04W 16/06 455/446 |
| 2009/0181714 A1 | 7/2009 | Yajima et al. | |
| 2011/0110337 A1* | 5/2011 | Grant | H04B 1/707 370/335 |
| 2014/0269580 A1 | 9/2014 | Huang et al. | |

FOREIGN PATENT DOCUMENTS

| | | |
|---|---|---|
| CN | 1780462 A | 5/2006 |
| CN | 101345988 A | 1/2009 |
| CN | 102726106 A | 10/2012 |
| EP | 2509372 A1 | 10/2012 |
| WO | WO 2008/066431 A1 | 6/2008 |

* cited by examiner

METHOD AND APPARATUS FOR CONFIGURING CHANNEL RESOURCE, BASE STATION, AND USER EQUIPMENT

CROSS-REFERENCE TO RELATED APPLICATION

This application is a continuation of International Application No. PCT/CN2012/088138 filed on Dec. 31, 2012, which is hereby incorporated by reference in its entirety.

TECHNICAL FIELD

The present invention relates to the field of communications technologies, and in particular, to a method and an apparatus for configuring a channel resource, a base station, and a user equipment.

BACKGROUND

With the development of smart phones (Smart phone), often a large number of users are online simultaneously. When no data is transmitted on an R99 channel, a large number of resources still need to be consumed, and therefore there are fewer available resources of a high-speed downlink packet access (HSDPA) data channel, thereby lowering capacity for transmitting downlink data.

Currently, on an R99 downlink (DL) dedicated physical channel (DPCH), power offsets of a DPDCH channel and a DPCCH channel in the DPCH channel is configured by a network side. Power offsets of a transport power control (TPC) domain, a transport format combination indicator (TFCI) domain, and a pilot (Pilot) domain in the DPCCH channel are configured differently and have different fixed values.

During the research and practice of the prior art, in an existing implementation manner, when a load of a cell is very high, the downlink DPCH channel occupies a large part of transmit power, resulting in low available power of the HSDPA channel for transmitting service data and thereby reducing downlink throughput of the cell. On the downlink DPCH channel, because no service data is sent most of the time and only control bits of the Pilot, TPC, and TFCI domains are sent, a large number of resources are wasted.

SUMMARY

Embodiments of the present invention provide a method and an apparatus for configuring a channel resource, a base station, and a user equipment, so as to solve a technical problem in the prior art that downlink throughput of a cell is reduced because a downlink DPCH channel occupies a large part of transmit power when a load of the cell is very high.

In order to solve the foregoing technical problem, the embodiments of the present invention disclose the following technical solutions:

In a first aspect, a method for configuring a channel resource is provided and includes:

determining load information of a cell; and when it is determined, according to the load information, that the cell reaches a congested state, configuring channel resource configuration information for a new user equipment accessing the cell, where the channel resource configuration information includes: a first dedicated physical channel pilot DPCH Pilot bit transmit power offset and/or the first number of pilot bits, the first DPCH Pilot bit transmit power offset is smaller than a DPCH Pilot bit transmit power offset configured for a user equipment in a non-congested state, and the first number of Pilot bits is smaller than the number of Pilot bits that is configured for a user equipment in a non-congested state.

In a first possible implementation manner of the first aspect, the method further includes:

when it is determined, according to the load information, that the cell does not reach the congested state, configuring the DPCH Pilot bit transmit power offset in the non-congested state or the number of pilot bits in the non-congested state for the new user equipment accessing the cell.

With reference to the first aspect or the first possible implementation manner of the first aspect, in a second possible implementation manner, the configuring channel resource configuration information for a new user equipment accessing the cell includes:

configuring, for the new user equipment accessing the cell, a preset DPCH Pilot bit transmit power offset configured for a user equipment in a congested state, or using a DPCH Pilot bit transmit power offset, which is obtained by decreasing at least one step length from the DPCH Pilot bit transmit power offset configured for the user equipment in the non-congested state, as the first DPCH Pilot bit transmit power offset; and/or configuring, for the new user equipment accessing the cell, the preset number of Pilot bits that is configured for a user equipment in a congested state, or using the number of Pilot bits, which is obtained by decreasing at least one step length from the number of Pilot bits that is configured for the user equipment in the non-congested state, as the first number of Pilot bits.

With reference to the first aspect or the first or the second possible implementation manner of the first aspect, in a third possible implementation manner, when it is determined, according to the load information, that the cell reaches a congested state, the method further includes:

if a DPCH Pilot bit transmit power offset of a user equipment already accessing the cell is greater than or equal to the first DPCH Pilot bit transmit power offset, decreasing at least one step length from a DPCH Pilot bit transmit power offset of at least one user equipment already accessing the cell; or if the number of Pilot bits of a user equipment already accessing the cell is greater than or equal to the first number of Pilot bits, decreasing at least one step length from the number of Pilot bits of the at least one user equipment already accessing the cell.

With reference to the first aspect or the first or the second or the third possible implementation manner of the first aspect, in a fourth possible implementation manner, when it is determined, according to the load information, that the cell does not reach the congested state, the method further includes:

if a DPCH Pilot bit transmit power offset of a user equipment already accessing the cell is smaller than the DPCH Pilot bit transmit power offset in the non-congested state, adding at least one step length to a DPCH Pilot bit transmit power offset or the number of Pilot bits of at least one user equipment already accessing the cell; or if the number of Pilot bits of a user equipment already accessing the cell is smaller than the number of Pilot bits in the non-congested state, adding at least one step length to the number of Pilot bits of the at least one user equipment already accessing the cell.

With reference to the first aspect or the first or the second or the third or the fourth possible implementation manner of the first aspect, in a fifth possible implementation manner, the determining load information of a cell includes:

detecting total transmit power of a current cell, detecting transmit power of an R99 channel, and/or collecting statistics about the number of users accessing the cell.

With reference to the first aspect or the first or the second or the third or the fourth or the fifth possible implementation manner of the first aspect, in a sixth possible implementation manner, the method further includes: sending the channel resource configuration information to the new user equipment.

In a second aspect, a method for configuring a channel resource is provided and includes:

receiving channel resource configuration information sent by a network side device, where the channel resource configuration information is configured by the network side device when it is determined, according to load information, that a cell reaches a congested state, and the channel resource configuration information includes: a first dedicated physical channel pilot DPCH Pilot bit transmit power offset and/or the first number of pilot bits, the first DPCH Pilot bit transmit power offset is smaller than a DPCH Pilot bit transmit power offset configured for a user equipment in a non-congested state, and the first number of Pilot bits is smaller than the number of Pilot bits that is configured for a user equipment in a non-congested state; and adjusting a channel resource according to the channel resource configuration information.

In a third aspect, an apparatus for configuring a channel resource is provided and includes:

a determining unit, configured to determine load information of a cell;

a judging unit, configured to determine, according to the load information, whether the cell reaches a congested state; and a first configuring unit, configured to: when the judging unit determines, according to the load information, that the cell reaches the congested state, configure a first dedicated physical channel pilot DPCH Pilot bit transmit power offset and/or the first number of pilot bits for a new user equipment accessing the cell, where the first DPCH Pilot bit transmit power offset is smaller than a DPCH Pilot bit transmit power offset configured for a user equipment in a non-congested state, and the first number of Pilot bits is smaller than the number of Pilot bits in a non-congested state.

In a first possible implementation manner of the third aspect, the apparatus further includes:

a second configuring unit, configured to: when the judging unit determines, according to the load information, that the cell does not reach the congested state, configure the DPCH Pilot bit transmit power offset in the non-congested state or the number of pilot bits in the non-congested state for the new user equipment accessing the cell.

With reference to the third aspect or the first possible implementation manner of the third aspect, in a second possible implementation manner of the third aspect, the first configuring unit includes:

a power offset configuring unit, configured to configure, for the new user equipment accessing the cell, a preset DPCH Pilot bit transmit power offset configured for a user equipment in a congested state, or use a DPCH Pilot bit transmit power offset, which is obtained by decreasing at least one step length from the DPCH Pilot bit transmit power offset configured for the user equipment in the non-congested state, as the first DPCH Pilot bit transmit power offset; and/or a unit for configuring the number of bits, configured to configure, for the new user equipment accessing the cell, the preset number of Pilot bits that is configured for a user equipment in a congested state, or use the number of Pilot bits, which is obtained by decreasing at least one step length from the number of Pilot bits that is configured for a user equipment in a non-congested state, as the first number of Pilot bits.

With reference to the third aspect or the first or the second possible implementation manner of the third aspect, in a third possible implementation manner of the third aspect, the apparatus further includes:

a first adjusting unit, configured to: when the judging unit determines, according to the load information, that the cell reaches the congested state, if a DPCH Pilot bit transmit power offset of a user equipment already accessing the cell is greater than or equal to the first DPCH Pilot bit transmit power offset, decrease at least one step length from a DPCH Pilot bit transmit power offset of at least one user equipment already accessing the cell; and/or a second adjusting unit, configured to: when the judging unit determines, according to the load information, that the cell reaches the congested state, if the number of Pilot bits of a user equipment already accessing the cell is greater than or equal to the first number of Pilot bits, decrease at least one step length from the number of Pilot bits of the user equipment already accessing the cell.

With reference to the third aspect or the first or the second or the third possible implementation manner of the third aspect, in a fourth possible implementation manner of the third aspect, the apparatus further includes:

a third adjusting unit, configured to: when the judging unit determines, according to the load information, that the cell does not reach the congested state, if a DPCH Pilot bit transmit power offset of a user equipment already accessing the cell is smaller than the DPCH Pilot bit transmit power offset in the non-congested state, add at least one step length to the DPCH Pilot bit transmit power offset of the at least one user equipment already accessing the cell; and/or a fourth adjusting unit, configured to: when the judging unit determines, according to the load information, that the cell does not reach the congested state, if the number of Pilot bits of the user equipment already accessing the cell is smaller than the number of Pilot bits in the non-congested state, add at least one step length to the number of Pilot bits of the user equipment already accessing the cell.

With reference to the third aspect or the first or the second or the third or the fourth possible implementation manner of the third aspect, in a fifth possible implementation manner of the third aspect, the determining unit includes:

a first determining unit, configured to detect total transmit power of a cell, and determine load information of the cell according to the total transmit power of the cell; and/or a second determining unit, configured to detect transmit power of an R99 channel, and obtain load information of the cell according to the transmit power of the R99 channel; and/or a statistics collecting unit, configured to collect statistics about the number of users accessing the cell, and determine load information according to the number of users accessing the cell.

With reference to the third aspect or the first or the second or the third or the fourth or the fifth possible implementation manner of the third aspect, in a sixth possible implementation manner of the third aspect, the apparatus further includes:

a sending unit, configured to send the channel resource configuration information to the new user equipment.

In a fourth aspect, an apparatus for configuring a channel resource is provided and includes:

a receiving unit, configured to receive channel resource configuration information sent by a network side device, where the channel resource configuration information is configured by the network side device when it is determined, according to load information, that a cell reaches a congested state, the channel resource configuration information includes: a first dedicated physical channel pilot DPCH Pilot bit transmit power offset and/or the first number of pilot bits, the first DPCH Pilot bit transmit power offset is smaller than a DPCH Pilot bit transmit power offset configured for a user equipment in a non-congested state, and the first number of Pilot bits is smaller than the number of Pilot bits that is configured for a user equipment in a non-congested state; and an adjusting unit, configured to adjust a channel resource according to the channel resource configuration information.

In a fifth aspect, a base station is provided and includes the apparatus for configuring a channel resource.

In a sixth aspect, a user equipment is provided and includes the apparatus for configuring a channel resource.

In a seventh aspect, a base station is provided and includes:

a processor, configured to determine load information of a cell, and when it is determined, according to the load information, that the cell reaches a congested state, configure channel resource configuration information for a new user equipment accessing the cell, where the channel resource configuration information includes: a first dedicated physical channel pilot DPCH Pilot bit transmit power offset or the first number of pilot bits, the first DPCH Pilot bit transmit power offset is smaller than a DPCH Pilot bit transmit power offset configured for a user equipment in a non-congested state, and the first number of Pilot bits is smaller than the number of Pilot bits in a non-congested state.

In a first possible implementation manner of the seventh aspect, the processor is further configured to: when it is determined, according to the load information, that the cell does not reach the congested state, configure the DPCH Pilot bit transmit power offset in the non-congested state or the number of pilot bits in the non-congested state for the new user equipment accessing the cell.

With reference to the seventh aspect or the first possible implementation manner of the seventh aspect, in a second possible implementation manner of the seventh aspect, that the processor configures the channel resource configuration information for the new user equipment accessing the cell includes:

configuring, for the new user equipment accessing the cell, a preset DPCH Pilot bit transmit power offset configured for a user equipment in a congested state, or using a DPCH Pilot bit transmit power offset, which is obtained by decreasing at least one step length from the DPCH Pilot bit transmit power offset configured for the user equipment in the non-congested state, as the first DPCH Pilot bit transmit power offset; and/or configuring, for the new user equipment accessing the cell, the preset number of Pilot bits that is configured for a user equipment in a congested state, or using the number of Pilot bits, which is obtained by decreasing at least one step length from the number of Pilot bits that is configured for a user equipment in a non-congested state, as the first number of Pilot bits.

With reference to the seventh aspect or the first or the second possible implementation manner of the seventh aspect, in a third possible implementation manner of the seventh aspect, the processor is further configured to: when it is determined, according to the load information, that the cell reaches the congested state, if a DPCH Pilot bit transmit power offset of a user equipment already accessing the cell is greater than or equal to the first DPCH Pilot bit transmit power offset, decrease at least one step length from a DPCH Pilot bit transmit power offset of at least one user equipment already accessing the cell; or if the number of Pilot bits of at least one user equipment already accessing the cell is greater than or equal to the first number of Pilot bits, decrease at least one step length from the number of Pilot bits of the user equipment already accessing the cell.

With reference to the seventh aspect or the first or the second or the third possible implementation manner of the seventh aspect, in a fourth possible implementation manner of the seventh aspect, the processor is further configured to: when it is determined, according to the load information, that the cell does not reach the congested state, if a DPCH Pilot bit transmit power offset of a user equipment already accessing the cell is smaller than the DPCH Pilot bit transmit power offset in the non-congested state, add at least one step length to the DPCH Pilot bit transmit power offset of the at least one user equipment already accessing the cell; or if the number of Pilot bits of the user equipment already accessing the cell is smaller than the number of Pilot bits in the non-congested state, add at least one step length to the number of Pilot bits of the at least one user equipment already accessing the cell.

With reference to the seventh aspect or the first or the second or the third or the fourth possible implementation manner of the seventh aspect, in a fifth possible implementation manner of the seventh aspect, that the processor determines the load information of the cell specifically includes: detecting total transmit power of a current cell, detecting transmit power of an R99 channel, and/or collecting statistics about the number of users accessing the cell.

With reference to the seventh aspect or the first or the second or the third or the fourth or the fifth possible implementation manner of the seventh aspect, in a sixth possible implementation manner of the seventh aspect, the base station further includes:

a radio transceiver, configured to send the channel resource configuration information to the new user equipment.

In an eighth aspect, a user equipment is provided and includes:

a transceiver, configured to receive channel resource configuration information that is configured for a new user equipment accessing a cell and is sent by a network side device, where the channel resource configuration information is configured by the network side device when it is determined, according to load information, that the cell reaches a congested state, the channel resource configuration information includes: a first dedicated physical channel pilot DPCH Pilot bit transmit power offset and/or the first number of pilot bits, the first DPCH Pilot bit transmit power offset is smaller than a DPCH Pilot bit transmit power offset configured for a user equipment in a non-congested state, and the first number of Pilot bits is smaller than the number of Pilot bits that is configured for a user equipment in a non-congested state; and a processor, configured to adjust a channel resource according to the channel resource configuration information.

It can be known, from the foregoing technical solutions, that, in the embodiments of the present invention, when the load of the cell is high, a reduced transmit power offset or the reduced number of bits is configured for the new user equipment to reduce transmit power occupied by a downlink DPCH channel; when the load is low, the transmit power occupied by a downlink DPCH channel is increased by configuring, for the new user equipment, a higher transmit power offset or the larger number of bits, thereby improving downlink throughput of the cell in a high load, and reducing a call drop rate in a low load.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
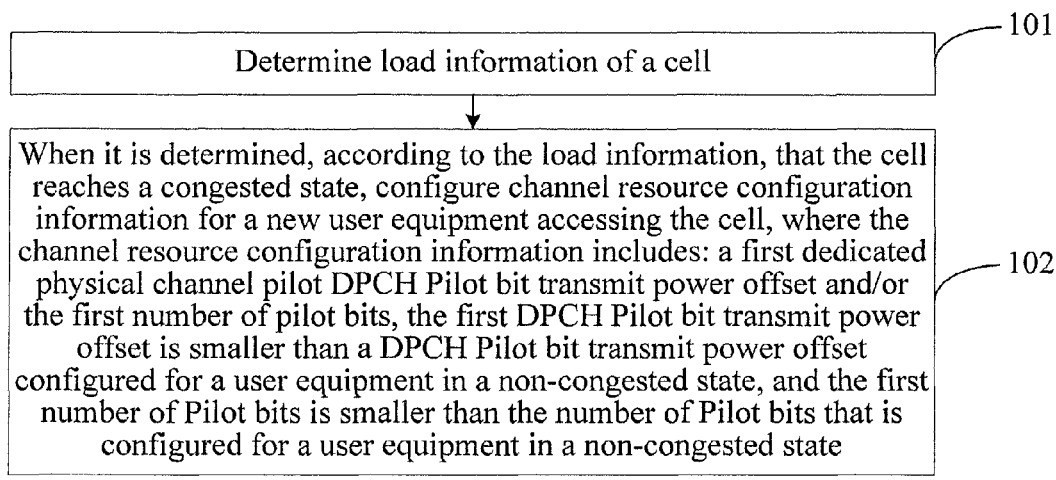
FIG. 1 is a flow chart of a method for configuring a channel resource according to an embodiment of the present invention.

Referring to FIG. 1, FIG. 1 is a flow chart of a method for configuring a channel resource according to an embodiment of the present invention. The method may include:

Step 101. Determine load information of a cell.

In this step, a base station may detect total transmit power of the cell, or, detect transmit power of an R99 channel, or, collect statistics about the number of users accessing the cell; however, this step is not limited thereto, and the load information of the cell may be determined in another manner, which is not limited in this embodiment.

Step 102. When it is determined, according to the load information, that the cell reaches a congested state, configure channel resource configuration information for a new user equipment accessing the cell, where the channel resource configuration information includes: a first dedicated physical channel pilot DPCH Pilot bit transmit power offset and/or the first number of pilot bits, the first DPCH Pilot bit transmit power offset is smaller than a DPCH Pilot bit transmit power offset configured for a user equipment in a non-congested state, and the first number of Pilot bits is smaller than the number of Pilot bits that is configured for a user equipment in a non-congested state.

In this embodiment, the configuring channel resource configuration information for a new user equipment accessing the cell includes:

configuring, for the new user equipment accessing the cell, a preset DPCH Pilot bit transmit power offset configured for a user equipment in a congested state, or using a DPCH Pilot bit transmit power offset, which is obtained by decreasing at least one step length from the DPCH Pilot bit transmit power offset configured for the user equipment in the non-congested state, as the first DPCH Pilot bit transmit power offset; and/or configuring, for the new user equipment accessing the cell, the preset number of Pilot bits that is configured for a user equipment in a congested state, or using the number of Pilot bits, which is obtained by decreasing at least one step length from the number of Pilot bits that is configured for the user equipment in the non-congested state, as the first number of Pilot bits. However, this is not limited thereto, and another manner may also be included, which is not limited in this embodiment.

In this step, the base station may detect total transmit power of the cell, and determine, according to the total transmit power of the cell, whether the cell reaches the congested state, which specifically is, when the total transmit power of the cell exceeds a predefined total power congestion threshold of the cell, determine that the cell enters the congested state, and when the total transmit power of the cell is smaller than the predefined total power congestion threshold of the cell, determine that the cell is in a non-congested state; or, detect transmit power of a dedicated channel (such as a dedicated channel DCH) for a non high speed packet access (HSPA) service, and determine, according to the transmit power of the R99 channel, whether the cell reaches the congested state, specifically, when the transmit power of the R99 channel of the cell exceeds a predefined transmit power congestion threshold of the R99 channel, determine that the cell enters the congested state; and when the transmit power of the R99 channel of the cell is smaller than the predefined transmit power congestion threshold of the R99 channel, determine that the cell is in the non-congested state; or, collect statistics about the number of users accessing the cell, if the number of users accessing the cell reaches a preset threshold, determine that the cell reaches the congested state, and otherwise, determine that the cell does not reach the congested state. Certainly, this embodiment is not limited to the foregoing three manners, and whether the cell reaches the congested state may be determined in another manner.

That the cell reaches the congested state may be determined in any one of the foregoing three manners, or through a combination of at least two manners of the foregoing three manners. In determining whether the cell reaches the congested state, each factor mentioned in the foregoing may be considered independently, and the factors may also be combined for determination, for example, it is determined that the cell reaches the congested state only when all factors satisfy congestion conditions, which is not limited in the embodiment of the present invention. Based on step 101, if the load information of the cell is determined through the total transmit power of the cell already accessed, the preset congestion threshold is a preset power congestion threshold of the cell, and correspondingly, if it is determined, according to the load information, that the total transmit power of the cell is greater than the preset power congestion threshold of the cell, the first dedicated physical channel pilot DPCH Pilot bit transmit power offset or the first number of pilot bits needs to be configured for the new user equipment accessing the cell.

If the load information of the cell is determined by detecting the transmit power of the R99 channel, the preset congestion threshold is a preset channel power congestion threshold, and correspondingly, if it is determined, according to the load information, that the transmit power of the cell is greater than the preset channel power congestion threshold, the first dedicated physical channel pilot DPCH Pilot bit transmit power offset or the first number of pilot bits needs to be configured for the new user equipment accessing the cell. It should be noted that the first DPCH Pilot bit transmit power offset is smaller than the DPCH Pilot bit transmit power offset in the non-congested state, and the first number of Pilot bits is smaller than the number of Pilot bits in the non-congested state.

That is to say, when it is determined, according to the load information, that the total transmit power of the R99 channel of the cell is greater than a corresponding preset congestion threshold, a lower DPCH Pilot bit transmit power offset (that is, a dedicated physical channel pilot DPCH Pilot bit transmit power offset in a congested state), or the smaller number of pilot bits (that is, the number of pilot bits in a congested state) needs to be configured for the new user equipment accessing the cell.

For example, when it is determined, according to the load information, that the cell reaches the congested state, a lower dedicated physical channel pilot DPCH Pilot bit transmit power offset in a congested state, which may be, but is not limited to, 0 dB, is configured for a new accessing user equipment, if a dedicated physical channel pilot DPCH Pilot bit transmit power offset in a non-congested state is 6 dB, the dedicated physical channel pilot DPCH Pilot bit transmit power offset in the congested state configured for the new accessing user equipment may also be any one between 1 dB to 5 dB, as long as it is lower than the dedicated physical channel pilot DPCH Pilot bit transmit power offset in the non-congested state.

The configured smaller number of pilot bits in the congested state may be, but is not limited to, 2, if the number of pilot bits in a non-congested state is 8, the number of pilot bits in the congested state configured for the new user equipment may also be either 4 or 8, as long as it is smaller than the number of pilot bits in the non-congested state.

Optionally, in another embodiment, the channel resource configuration information may also be sent to the new user equipment.

In the embodiment of the present invention, when the load of the cell is high, transmit power occupied by a downlink DPCH channel is reduced, and a reduced transmit power offset or the reduced number of bits is configured for a new user equipment, thereby improving downlink throughput of the cell and reducing a call drop rate.

Optionally, in another embodiment which is based on the embodiment shown in FIG. 1, the method further includes: when it is determined, according to the load information, that the cell does not reach the congested state, configuring the DPCH Pilot bit transmit power offset in the non-congested state or the number of pilot bits in the non-congested state for the new user equipment accessing the cell.

When the cell reaches the congested state, a lower dedicated physical channel pilot DPCH Pilot bit transmit power offset in a congested state (that is, a first DPCH Pilot bit transmit power offset), which, for example, may be 0 dB, is configured for the new accessing user equipment; when the cell does not reach the congested state, a higher dedicated physical channel pilot DPCH Pilot bit transmit power offset in a non-congested state, which, for example, may be 6 dB, is configured for the new accessing user equipment. Certainly, a value of the DPCH Pilot bit transmit power offset is not limited to 0 dB and 6 dB, and may also be any one between 1 dB to 5 dB.

It should be noted that the first dedicated physical channel pilot DPCH Pilot bit transmit power offset may be a DPCH Pilot bit transmit power offset in a congested state, and the DPCH Pilot bit transmit power offset in the congested state and the DPCH Pilot bit transmit power offset in the non-congested state are relative values, but the DPCH Pilot bit transmit power offset in the congested state is smaller than the DPCH Pilot bit transmit power offset in the non-congested state.

Similarly, the first number of Pilot bits may be the number of Pilot bits in a congested state, and the number of Pilot bits in the congested state and the number of Pilot bits in a non-congested state are relative values, but the number of Pilot bits in the congested state is smaller than the number of Pilot bits in the non-congested state.

In this embodiment of the present invention, when the load of the cell is high, a reduced transmit power offset or the reduced number of bits is configured for the new user equipment to reduce transmit power occupied by a downlink DPCH channel. When the load is low, the transmit power occupied by the downlink DPCH channel is increased by configuring, for the new user equipment, a higher transmit power offset or the larger number of bits, thereby improving downlink throughput of the cell in a high load and reducing a call drop rate in a low load.

Optionally, in another embodiment, based on all the foregoing embodiments, in this embodiment, when it is determined, according to the load information, that the cell does not reach the congested state, the method may further include: determining whether the DPCH Pilot bit transmit power offset of the user equipment already accessing the cell is greater than or equal to the DPCH Pilot bit transmit power offset in the congested state, and if yes, decreasing at least one step length from the DPCH Pilot bit transmit power offset of the user equipment accessing the cell; or when it is determined, according to the load information, that the cell does not reach the congested state, the method may further include: determining whether the number of Pilot bits of the user equipment accessing the cell is greater than or equal to the number of Pilot bits in the congested state, and if yes, decreasing at least one step length from the number of Pilot bits of the at least one user equipment already accessing the cell.

That is to say, in this embodiment, when it is determined that the cell reaches the congested state, in addition to configuring a lower DPCH Pilot bit transmit power offset or the smaller number of Pilot bits for the new user equipment accessing the cell, it may also be determined whether the DPCH Pilot bit transmit power offset or the number of Pilot bits of a user accessing the cell is higher than a current configuration, and if the DPCH Pilot bit transmit power offset or the number of Pilot bits of a user accessing the cell is higher than a current configuration, a reduced DPCH Pilot bit transmit power offset or the reduced number of Pilot bits of the at least one user equipment already accessing the cell may be configured.

Optionally, in another embodiment, based on the foregoing embodiments, in this embodiment, when it is determined, according to the load information, that the cell does not reach the congested state, the method may further include: determining whether the DPCH Pilot bit transmit power offset of the user equipment accessing the cell is smaller than the DPCH Pilot bit transmit power offset in the non-congested state, and if yes, adding at least one step length to the DPCH Pilot bit transmit power offset of the at least one user equipment already accessing the cell; or determining whether the number of Pilot bits of the user equipment accessing the cell is smaller than the number of Pilot bits in the non-congested state, and if yes, adding at least one step length to the number of Pilot bits of at least one user equipment already accessing the cell.

That is to say, in this embodiment, when it is determined, according to the load information, that the cell does not reach the congested state, in addition to configuring a lower DPCH Pilot bit transmit power offset in a non-congested state or the small number of Pilot bits in a non-congested state for the new user equipment accessing the cell, it may also be determined whether the DPCH Pilot bit transmit power offset or the number of Pilot bits of the user equipment accessing the cell is lower than the current configuration, and if the DPCH Pilot bit transmit power offset or the number of Pilot bits of the user equipment accessing the cell is lower than the current configuration, an increased DPCH Pilot bit transmit power offset or the increased number of Pilot bits of the at least one user equipment already accessing the cell may be configured.

Figure 2:
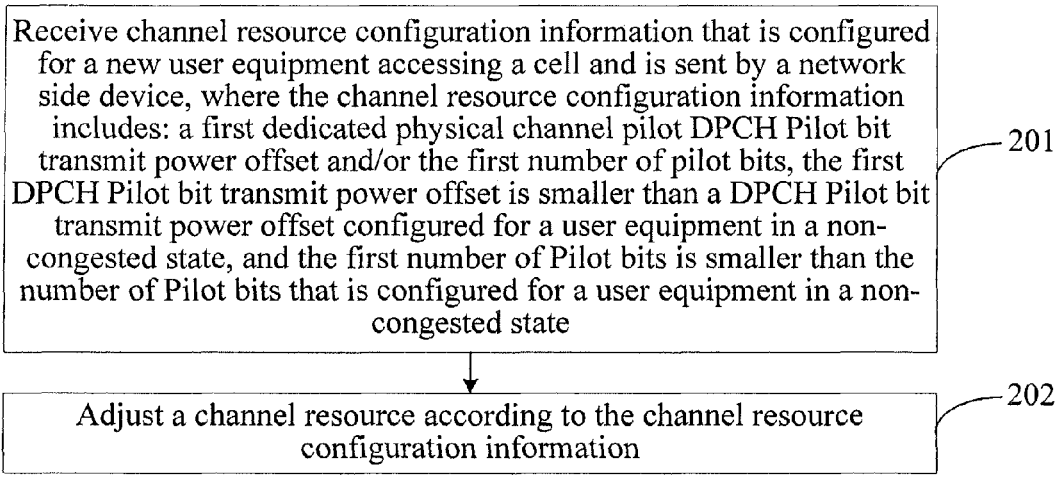
FIG. 2 is another flow chart of a method for configuring a channel resource according to an embodiment of the present invention.

Referring to FIG. 2, FIG. 2 is another flow chart of a method for configuring a channel resource according to an embodiment of the present invention. The method includes:

Step 201. Receive channel resource configuration information that is configured for a new user equipment accessing a cell and is sent by a network side device, where the channel resource configuration information is configured by the network side device when it is determined, according to load information, that the cell reaches a congested state, the channel resource configuration information includes: a first dedicated physical channel pilot DPCH Pilot bit transmit power offset and/or the first number of pilot bits, the first DPCH Pilot bit transmit power offset is smaller than a DPCH Pilot bit transmit power offset configured for a user equipment in a non-congested state, and the first number of Pilot bits is smaller than the number of Pilot bits that is configured for a user equipment in a non-congested state.

Step 202. Adjust a channel resource according to the channel resource configuration information.

In this embodiment, when receiving the channel resource configuration information sent by the network side device (such as a base station), the new user equipment accessing the cell configures a channel resource according to the channel resource configuration information, thereby improving downlink throughput of the cell in a high load and reducing a call drop rate in a low load.

Figure 3:
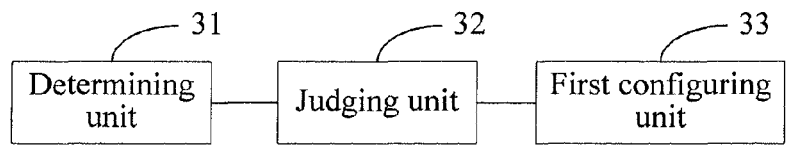
FIG. 3 is a schematic structural diagram of an apparatus for configuring a channel resource according to an embodiment of the present invention.

Based on implementation processes of the foregoing methods, an embodiment of the present invention further provides an apparatus for configuring a channel resource, a schematic structural diagram of which is shown in FIG. 3, and the apparatus includes: a determining unit 31, a judging unit 32, and a first configuring unit 33, where the determining unit 31 is configured to determine load information of a cell, where the determining unit may include a first determining unit, a second determining unit and/or a third determining unit. The first determining unit is configured to detect total transmit power of the cell, and determine the load information of the cell according to the total transmit power of the cell; the second determining unit is configured to detect transmit power of an R99 channel, and obtain the load information of the cell according to the transmit power of the R99 channel; and the statistics collecting unit is configured to collect statistics about the number of users accessing the cell, and determine the load information according to the number of users accessing the cell;

the judging unit 32 is configured to determine, according to the load information, whether the cell reaches a congested state; and the first configuring unit 33 is configured to: when it is determined, according to the load information, that the cell reaches the congested state, configure a first dedicated physical channel pilot DPCH Pilot bit transmit power offset and/or the first number of pilot bits for a new user equipment accessing the cell, where the first DPCH Pilot bit transmit power offset is smaller than a DPCH Pilot bit transmit power offset configured for a user equipment in a non-congested state, and the first number of Pilot bits is smaller than the number of Pilot bits in a non-congested state.

Optionally, in another embodiment, based on the foregoing embodiments, in this embodiment, the first configuring unit includes: a power offset configuring unit and/or a unit for configuring the number of bits, where the power offset configuring unit is configured to configure, for the new user equipment accessing the cell, a preset DPCH Pilot bit transmit power offset configured for a user equipment in a congested state, or use a DPCH Pilot bit transmit power offset, which is obtained by decreasing at least one step length from the DPCH Pilot bit transmit power offset configured for the user equipment in the non-congested state, as the first DPCH Pilot bit transmit power offset; and the unit for configuring the number of bits is configured to configure, for the new user equipment accessing the cell, the preset number of Pilot bits that is configured for a user equipment in a congested state, or use the number of Pilot bits, which is obtained by decreasing at least one step length from the number of Pilot bits that is configured for a user equipment in a non-congested state, as the first number of Pilot bits.

Optionally, in another embodiment, the apparatus may further include a sending unit, configured to send the channel resource configuration information to the new user equipment.

In the embodiment of the present invention, when a load of the cell is high, the apparatus for configuring a channel resource may configure a reduced transmit power offset or the reduced number of bits for the new user equipment by reducing transmit power occupied by a downlink DPCH channel; when the load is low, the transmit power occupied by the downlink DPCH channel is increased to configure a higher transmit power offset or the larger number of bits for the new user equipment, thereby improving downlink throughput of a cell in a high load and reducing a call drop rate in a low load.

Figure 4:
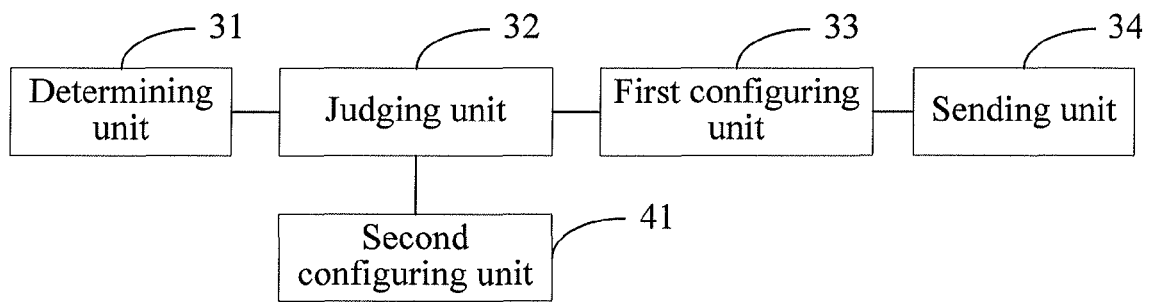
FIG. 4 is another schematic structural diagram of an apparatus for configuring a channel resource according to an embodiment of the present invention.

Optionally, in another embodiment, based on the embodiment of FIG. 3, in this embodiment, the apparatus may further include: a second configuring unit 41, a schematic structural diagram of which is shown in FIG. 4. FIG. 4 is another schematic structural diagram of an apparatus for configuring a channel resource according to an embodiment of the present invention.

The second configuring unit 41 is configured to: when the judging unit 32 determines, according to the load information, that the cell does not reach the congested state, configure a DPCH Pilot bit transmit power offset in a non-congested state or the number of pilot bits in a non-congested state for a new user equipment accessing the cell.

Figure 5:
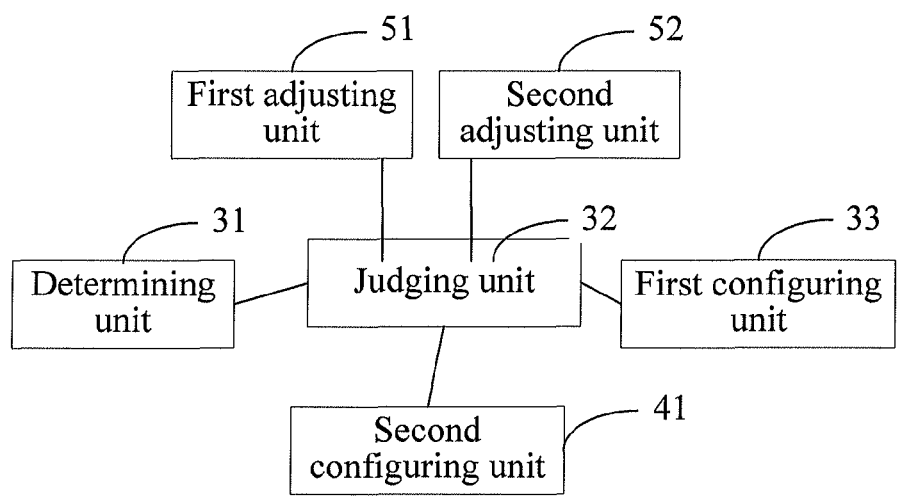
FIG. 5 is another schematic structural diagram of an apparatus for configuring a channel resource according to an embodiment of the present invention.

Optionally, in another embodiment, based on the embodiment of FIG. 4, in this embodiment, the apparatus may further include: a first adjusting unit 51 and/or a second adjusting unit 52 (this embodiment takes an example where both the first adjusting unit and the second adjusting unit are included), a schematic structural diagram of which is shown in FIG. 5. FIG. 5 is another schematic structural diagram of an apparatus for configuring a channel resource according to an embodiment of the present invention.

The first adjusting unit 51 is configured to: when the judging unit determines, according to the load information, that the cell reaches a congested state, if a DPCH Pilot bit transmit power offset of a user equipment already accessing the cell is greater than or equal to the first DPCH Pilot bit transmit power offset, decrease at least one step length from a DPCH Pilot bit transmit power offset of at least one user equipment already accessing the cell; the second adjusting unit 52 is configured to: when the judging unit determines, according to the load information, that the cell reaches the congested state, if the number of Pilot bits of at least one user equipment already accessing the cell is greater than or equal to the first number of Pilot bits, decrease at least one step length from the number of Pilot bits of the at least one user equipment already accessing the cell.

Figure 6:
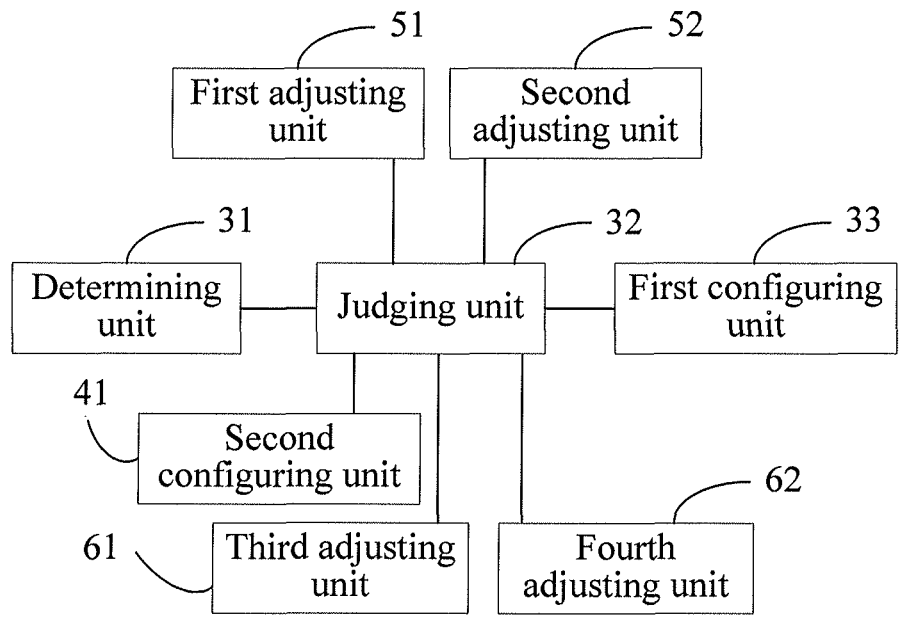
FIG. 6 is another schematic structural diagram of an apparatus for configuring a channel resource according to an embodiment of the present invention.

Optionally, in another embodiment, based on the foregoing embodiments, in this embodiment, the apparatus may further include: a third adjusting unit 61 and/or a third adjusting unit 62 (this embodiment takes an example where both the third adjusting unit and the fourth adjusting unit are included), and a schematic structural diagram of which is shown in FIG. 6. FIG. 6 is another schematic structural diagram of an apparatus for configuring a channel resource according to an embodiment of the present invention.

The third adjusting unit 61 is configured to: when the judging unit determines, according to the load information, that the cell does not reach a congested state, if a DPCH Pilot bit transmit power offset of a user equipment already accessing the cell is smaller than the DPCH Pilot bit transmit power offset in the non-congested state, add at least one step length to a DPCH Pilot bit transmit power offset or the number of Pilot bits of at least one user equipment already accessing the cell.

The fourth adjusting unit 62 is configured to: when the judging unit determines, according to the load information, that the cell does not reach the congested state, if the number of Pilot bits of the user equipment already accessing the cell is smaller than the number of Pilot bits in the non-congested state, add at least one step length to the number of Pilot bits of the at least one user equipment already accessing the cell.

For an implementation process of a function and an effect of each unit in the apparatus, reference may be made to a corresponding implementation process in the foregoing method, and details are not repeatedly described herein.

Figure 7:
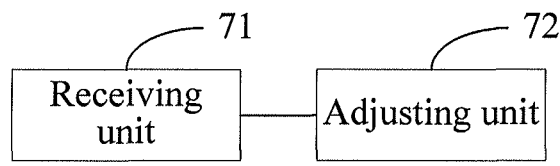
FIG. 7 is another schematic structural diagram of an apparatus for configuring a channel resource according to an embodiment of the present invention.

Referring to FIG. 7, FIG. 7 is another schematic structural diagram of an apparatus for configuring a channel resource according to an embodiment of the present invention. The apparatus includes a receiving unit 71 and an adjusting unit 72, where the receiving unit 71 is configured to: receive channel resource configuration information that is configured for a new user equipment accessing the cell and is sent by a network side device, where the channel resource configuration information includes: a first dedicated physical channel pilot DPCH Pilot bit transmit power offset and/or the first number of pilot bits, the first DPCH Pilot bit transmit power offset is smaller than a DPCH Pilot bit transmit power offset configured for a user equipment in a non-congested state, and the first number of Pilot bits is smaller than the number of Pilot bits that is configured for a user equipment in a non-congested state; and the adjusting unit 72 is configured to configure, according to the channel resource configuration information, a channel resource of the new user equipment accessing the cell.

For an implementation process of a function and an effect of each unit in the apparatus, reference may be made to a corresponding implementation process in the foregoing method, and details are not repeatedly described herein.

An embodiment of the present invention further provides a base station, including the apparatus for configuring a channel resource.

An embodiment of the present invention further provides a user equipment, including the apparatus for configuring a channel resource.

Figure 8:
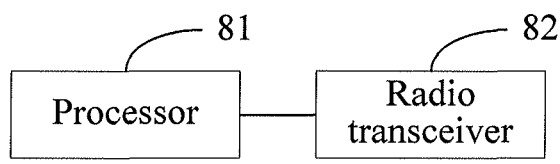
FIG. 8 is a schematic structural diagram of a base station according to an embodiment of the present invention.

An embodiment of the present invention further provides a base station, a schematic structural diagram of which is shown in FIG. 8. FIG. 8 is a schematic structural diagram of a base station according to an embodiment of the present invention. The base station includes a processor 81 and a radio transceiver 82.

The processor 81 is configured to determine load information of a cell, and when it is determined, according to the load information, that the cell reaches a congested state, configure channel resource configuration information for a new user equipment accessing the cell, where the channel resource configuration information includes: a first dedicated physical channel pilot DPCH Pilot bit transmit power offset or the first number of pilot bits, the first DPCH Pilot bit transmit power offset is smaller than a DPCH Pilot bit transmit power offset in a non-congested state, and the first number of Pilot bits is smaller than the number of Pilot bits in a non-congested state.

The radio transceiver 82 is configured to send the channel resource configuration information to the new user equipment.

Optionally, the processor is further configured to: when it is determined, according to the load information, that the cell does not reach the congested state, configure the DPCH Pilot bit transmit power offset in the non-congested state or the number of pilot bits in the non-congested state for the new user equipment accessing the cell.

Optionally, the processor is further configured to: when it is determined, according to the load information, that the cell reaches the congested state, if a DPCH Pilot bit transmit power offset of a user equipment already accessing the cell is greater than or equal to the first DPCH Pilot bit transmit power offset, decrease at least one step length from a DPCH Pilot bit transmit power offset of at least one user equipment already accessing the cell; or if the number of Pilot bits of a user equipment already accessing the cell is greater than or equal to the first number of Pilot bits, decrease at least one step length from the number of Pilot bits of the user equipment already accessing the cell.

Optionally, the processor is further configured to: when it is determined, according to the load information, that the cell does not reach the congested state, if a DPCH Pilot bit transmit power offset of a user equipment already accessing the cell is smaller than the DPCH Pilot bit transmit power offset in the non-congested state, add at least one step length to the DPCH Pilot bit transmit power offset of the at least one user equipment already accessing the cell; or if the number of Pilot bits of a user equipment already accessing the cell is smaller than the number of Pilot bits in the non-congested state, add at least one step length to the number of Pilot bits of the at least one user equipment already accessing the cell.

Optionally, that the processor determines the load information of the cell includes: detecting total transmit power of a current cell, detecting transmit power of an R99 channel, and/or collecting statistics about the number of users accessing the cell.

For an implementation process of a function and an effect of the processor and the radio transceiver in the apparatus, reference may be made to a corresponding implementation process in the foregoing method, which are not repeatedly described herein.

Figure 9:
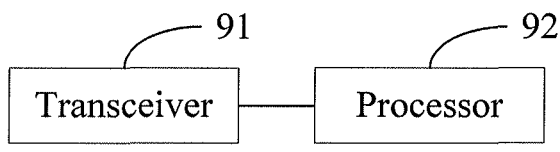
FIG. 9 is a schematic structural diagram of a user equipment according to an embodiment of the present invention.

An embodiment of the present invention further provides a user equipment, a schematic structural diagram of which is shown in FIG. 9. FIG. 9 is a schematic structural diagram of a user equipment according to an embodiment of the present invention. The user equipment includes: a transceiver 91 and a processor 92.

The transceiver 91 is configured to receive channel resource configuration information that is configured for a new user equipment accessing a cell and is sent by a network side device, where the channel resource configuration information is configured by the network side device when it is determined, according to load information, that the cell reaches the congested state, the channel resource configuration information includes: a first dedicated physical channel pilot DPCH Pilot bit transmit power offset and/or the first number of pilot bits, the first DPCH Pilot bit transmit power offset is smaller than a DPCH Pilot bit transmit power offset configured for a user equipment in a non-congested state, and the first number of Pilot bits is smaller than the number of Pilot bits that is configured for a user equipment in a non-congested state.

The processor 92 is configured to adjust a channel resource according to the channel resource configuration information.

For an implementation process of a function and an effect of the processor and the transceiver in the apparatus, reference may be made to a corresponding implementation process in the foregoing method, which are not repeatedly described herein.

In the embodiment of the present invention, when a load of the cell is high, a reduced transmit power offset or the reduced number of bits may be configured for the new user equipment by reducing transmit power occupied by a downlink DPCH channel. When the load is low, the transmit power occupied by the downlink DPCH channel may be increased to configure a higher transmit power offset or the larger number of bits configured for the new user equipment, thereby improving downlink throughput of the cell in a high load and reducing a call drop rate in a low load.

It should be noted that in the specification, relational terms such as first and second are used only to differentiate an entity or operation from another entity or operation, and do not require or imply that any actual relationship or sequence exists between these entities or operations. Moreover, the terms "include", "comprise", or their any other variant is intended to cover a non-exclusive inclusion, so that, a process, a method, an article, or a device that includes a list of elements not only includes those elements, but also includes other elements which are not expressly listed, or further includes elements inherent to such process, method, article, or device. An element preceded by "includes a . . . " does not, without more constraints, preclude the existence of additional identical elements in the process, method, article, or device that includes the element.

Through the foregoing description of the implementation manners, a person skilled in the art may clearly understand that the present invention may be implemented in a manner of software plus a necessary universal hardware platform, and certainly, may also be implemented by hardware; however, in most cases, the former is a preferred implementation manner. Based on such understanding, the technical solutions of the present invention or the part that makes contributions to the prior art can be substantially embodied in a form of a software product. The computer software product may be stored in a storage medium, such as a ROM/RAM, a magnetic disk, or an optical disk, and includes several instructions used to instruct a computer device (which may be a personal computer, a server, or a network device, or the like) to perform the method according to each embodiment of the present invention or certain parts of the embodiment of the present invention.

The foregoing description is only exemplary implementation manners of the present invention. It should be noted that, several improvements and modifications may be further made by a person of ordinary skill in the art without departing from the principles of the present invention, and these improvements and modifications shall also be construed as falling within the protection scope of the present invention.

What is claimed is:

1. A method for configuring a channel resource, comprising:
   determining, by a base station, load information of a cell;
   when it is determined, according to the load information, that the cell reaches a congested state, configuring, by the base station, R99 downlink channel resource configuration information for a new user equipment accessing the cell, wherein the R99 downlink channel resource configuration information comprises: a first dedicated physical channel pilot (DPCH Pilot) bit transmit power offset and a first number of pilot bits; the first DPCH Pilot bit transmit power offset is smaller than a DPCH Pilot bit transmit power offset configured for a user equipment in a non-congested state, and the first number of Pilot bits is smaller than a number of Pilot bits that is configured for a user equipment in a non-congested state; and
   sending by the base station, the R99 downlink channel resource configuration information to the new user equipment.

2. The method according to claim 1, further comprising:
when it is determined, according to the load information, that the cell does not reach the congested state, configuring the DPCH Pilot bit transmit power offset in the non-congested state or the number of pilot bits in the non-congested state for the new user equipment accessing the cell.

3. The method according to claim 1, wherein the configuring R99 downlink channel resource configuration information for a new user equipment accessing the cell comprises:
configuring, for the new user equipment accessing the cell, a preset DPCH Pilot bit transmit power offset configured for a user equipment in a congested state, or using a DPCH Pilot bit transmit power offset, which is obtained by decreasing at least one step length from the DPCH Pilot bit transmit power offset configured for the user equipment in the non-congested state, as the first DPCH Pilot bit transmit power offset; and
configuring, for the new user equipment accessing the cell, a preset number of Pilot bits that is configured for a user equipment in a congested state, or using a number of Pilot bits, which is obtained by decreasing at least one step length from the number of Pilot bits that is configured for the user equipment in the non-congested state, as the first number of Pilot bits.

4. The method according to claim 1, wherein when it is determined, according to the load information, that the cell reaches the congested state, the method further comprises:
if a DPCH Pilot bit transmit power offset of a user equipment already accessing the cell is greater than or equal to the first DPCH Pilot bit transmit power offset, decreasing at least one step length from a DPCH Pilot bit transmit power offset of at least one user equipment already accessing the cell; or
if the number of Pilot bits of a user equipment already accessing the cell is greater than or equal to the first number of Pilot bits, decreasing at least one step length from the number of Pilot bits of the at least one user equipment already accessing the cell.

5. The method according to claim 1, wherein when it is determined, according to the load information, that the cell does not reach the congested state, the method further comprises:
if a DPCH Pilot bit transmit power offset of a user equipment already accessing the cell is smaller than the DPCH Pilot bit transmit power offset in the non-congested state, adding at least one step length to a DPCH Pilot bit transmit power offset; or
if the number of Pilot bits of a user equipment already accessing the cell is smaller than the number of Pilot bits in the non-congested state, adding at least one step length to the number of Pilot bits of the at least one user equipment already accessing the cell.

6. The method according to claim 1, wherein the determining load information of a cell comprises:
detecting total transmit power of a current cell, detecting transmit power of the R99 channel, and/or collecting statistics about the number of users accessing the cell.

7. A method for configuring a channel resource, comprising:
receiving, by a user equipment, R99 downlink channel resource configuration information sent from a network side device, wherein the R99 downlink channel resource configuration information is configured by the network side device when it is determined, according to load information, that a cell reaches a congested state, the channel resource configuration information comprises: a first dedicated physical channel pilot (DPCH Pilot) bit transmit power offset and a first number of pilot bits, the first DPCH Pilot bit transmit power offset is smaller than a DPCH Pilot bit transmit power offset configured for a user equipment in a non-congested state, and the first number of Pilot bits is smaller than a number of Pilot bits that is configured for a user equipment in a non-congested state; and
adjusting, by the user equipment, a R99 downlink channel resource according to the R99 downlink channel resource configuration information.

8. A base station, comprising:
a processor, configured to determine load information of a cell, and when it is determined, according to the load information, that the cell reaches a congested state, configure R99 downlink channel resource configuration information for a new user equipment accessing the cell, wherein the channel resource configuration information comprises: a first dedicated physical channel pilot (DPCH Pilot) bit transmit power offset and a first number of pilot bits, the first DPCH Pilot bit transmit power offset is smaller than a DPCH Pilot bit transmit power offset configured for a user equipment in a non-congested state, and the first number of Pilot bits is smaller than a number of Pilot bits in a non-congested state; and
a radio transceiver, configured to send the R99 downlink channel resource configuration information to the new user equipment.

9. The base station according to claim 8, wherein the processor is further configured to: when it is determined, according to the load information, that the cell does not reach the congested state, configure the DPCH Pilot bit transmit power offset in the non-congested state or the number of pilot bits in the non-congested state for the new user equipment accessing the cell.

10. The base station according to claim 8, wherein that the processor configures the R99 downlink channel resource configuration information for a new user equipment accessing the cell comprises:
configuring, for the new user equipment accessing the cell, a preset DPCH Pilot bit transmit power offset configured for a user equipment in a congested state, or using a DPCH Pilot bit transmit power offset, which is obtained by decreasing at least one step length from the DPCH Pilot bit transmit power offset configured for the user equipment in the non-congested state, as the first DPCH Pilot bit transmit power offset; and
configuring, for the new user equipment accessing the cell, the preset number of Pilot bits that is configured for a user equipment in a congested state, or using the number of Pilot bits, which is obtained by decreasing at least one step length from the number of Pilot bits that is configured for a user equipment in a non-congested state, as the first number of Pilot bits.

11. The base station according to claim 8, wherein the processor is further configured to: when it is determined, according to the load information, that the cell reaches the congested state, if a DPCH Pilot bit transmit power offset of a user equipment already accessing the cell is greater than or equal to the first DPCH Pilot bit transmit power offset, decrease at least one step length from a DPCH Pilot bit transmit power offset of at least one user equipment already accessing the cell; or if the number of Pilot bits of at least one user equipment already accessing the cell is greater than or equal to the first number of Pilot bits, decrease at least one step length from the number of Pilot bits of the user equipment already accessing the cell.

12. The base station according to claim 8, wherein the processor is further configured to: when it is determined, according to the load information, that the cell does not reach a congested state, if a DPCH Pilot bit transmit power offset of a user equipment already accessing the cell is smaller than the DPCH Pilot bit transmit power offset in the non-congested state, add at least one step length to the DPCH Pilot bit transmit power offset of the at least one user equipment already accessing the cell; or if the number of Pilot bits of the user equipment already accessing the cell is smaller than the number of Pilot bits in the non-congested state, add at least one step length to the number of Pilot bits of the at least one user equipment already accessing the cell.

13. The base station according to claim 8, wherein that the processor determines load information of a cell includes: detecting total transmit power of a current cell, detecting transmit power of the R99 channel, and/or collecting statistics about the number of users accessing the cell.

14. A user equipment, comprising:
a transceiver, configured to receive R99 downlink channel resource configuration information that is configured for a new user equipment accessing a cell and is sent from a network side device, wherein the R99 downlink channel resource configuration information is configured by the network side device when it is determined, according to load information, that the cell reaches a congested state, the channel resource configuration information comprises: a first dedicated physical channel pilot (DPCH Pilot) bit transmit power offset and a first number of pilot bits, the first DPCH Pilot bit transmit power offset is smaller than a DPCH Pilot bit transmit power offset configured for a user equipment in a non-congested state, and the first number of Pilot bits is smaller than a number of Pilot bits that is configured for a user equipment in a non-congested state; and
a processor, configured to adjust a R99 downlink channel resource according to the R99 downlink channel resource configuration information.

* * * * *